United States Patent [19]

Kawamura et al.

[11] Patent Number: 4,814,999
[45] Date of Patent: Mar. 21, 1989

[54] AUTOMATIC PROGRAMMING SYSTEM

[75] Inventors: Hideaki Kawamura; Sasaki Takao, both of Hachiouji, Japan

[73] Assignee: Fanuc Ltd., Minamitsuru, Japan

[21] Appl. No.: 832,717

[22] PCT Filed: Jun. 5, 1985

[86] PCT No.: PCT/JP85/00322

§ 371 Date: Jan. 31, 1986

§ 102(e) Date: Jan. 31, 1986

[87] PCT Pub. No.: WO85/05702

PCT Pub. Date: Dec. 19, 1985

[30] Foreign Application Priority Data

Jun. 5, 1984 [JP] Japan ................................. 59-113798

[51] Int. Cl.$^4$ ............................................ G05B 19/403
[52] U.S. Cl. ........................ 364/474.2; 364/474.11; 364/474.22; 364/192
[58] Field of Search ............... 364/474, 475, 167–171, 364/191, 192, 474.11, 474.2, 474.22; 318/568; 82/2 B

[56] References Cited

U.S. PATENT DOCUMENTS

| | | | |
|---|---|---|---|
| 3,573,737 | 4/1971 | Rosenberg | 364/200 |
| 3,573,738 | 4/1971 | Bottles et al. | 364/200 |
| 3,597,740 | 8/1971 | Daw et al. | 364/169 |
| 3,739,157 | 6/1973 | Bobrowicz et al. | 318/568 X |
| 4,092,720 | 5/1978 | Carey | 364/474 |
| 4,558,419 | 12/1985 | Kanematsu et al. | 364/474 |
| 4,700,313 | 10/1987 | Takagawa | 364/474 |

FOREIGN PATENT DOCUMENTS 1431217 4/1976 United Kingdom ................ 364/474

Primary Examiner—Allen MacDonald
Attorney, Agent, or Firm—Staas & Halsey

[57] ABSTRACT

In an automatic programming system for a two-saddle NC turret lathe, shape definition and machining data for defining a machining condition for each machining step are input at each machining step together with a machining code indicating the machining from machining step input apparatus, and stored in a memory. A series of machining steps to be performed by each saddle is set in steps S1 to S9 by assigning, with a machining assigning/setting apparatus, either a machining code indicating the machining condition at each of the series of the machining steps or a wait command. Then, the machining program for each saddle is automatically created by program creating apparatus in accordance with the set data and stored data.

1 Claim, 3 Drawing Sheets

| STEP NUMBER | SADDLE 1 | | SADDLE 2 | |
|---|---|---|---|---|
| | MACHINING CODE | WAIT | MACHINING NUMBER CODE | WAIT |
| 1 | N'1 | — | N'3 | — |
| 2 | — | YES | N'4 | — |
| 3 | N'2 | — | — | YES |
| 4 | — | YES | N'5 | — |
| 5 | N'6 | — | — | YES |
| 6 | N'7 | — | — | — |

FIG. 3

| STEP NUMBER | SADDLE 1 | | SADDLE 2 | |
|---|---|---|---|---|
| | MACHINING CODE | WAIT | MACHINING NUMBER CODE | WAIT |
| 1 | N'1 | ___ | N'3 | ___ |
| 2 | ___ | YES | N'4 | ___ |
| 3 | N'2 | ___ | ___ | YES |
| 4 | ___ | YES | N'5 | ___ |
| 5 | N'6 | ___ | ___ | YES |
| 6 | N'7 | ___ | ___ | ___ |

AUTOMATIC PROGRAMMING SYSTEM

TECHNICAL FIELD

The present invention relates to an automatic programming system for a one-spindle two-saddle NC turret lathe.

BACKGROUND ART

It is conventionally known to create an NC tape for driving an NC machine tool by automatic programming, saving time and obtaining an accurate program.

However, when a program for machining a material 2 such as the round rod as shown in FIG. 1 with a two-saddle turret lathe to obtain a product having a hole 3 and an outer shape 1 is created by an automatic programming apparatus, it is necessary to determine which machining steps are to be performed by respective saddles and also whether machining can be performed by both saddles simultaneously. For example, the machining steps shown in FIG. 1 include rough cutting step N1 and finishing step N2 as outer-diameter machining, drilling step N3, rough cutting step N4 and finishing step N5 as inner-diameter machining of the hole formed by the drilling step N3, and rough cutting step N6 and finishing step N7 as face grinding. Among these, the rough cuttings steps N1, N4 and N6 can be performed simultaneously with the drilling step N3, but cannot be performed simultaneously with the finishing steps. Therefore, each machining step is assigned to a saddle. It is then determined which of the steps are to be performed simultaneously and when to start machining, thereby creating a program for each of the saddles.

SUMMARY OF THE INVENTION

It is an object of the present invention to provide an automatic programming system which can easily create a program for a one-spindle, two-saddle NC turret lathe.

In order to solve the above-mentioned problem, an automatic programming system for a two-saddle NC turret lathe according to the present invention is characterized in that shape definition (for defining a machining condition for each machining step) and machining data (including at least a tool designation and a machining speed) are input for each machining step together with a machining code identifying the machining step from machining step input means. The shape definition and the machining data input by the machining step input means are stored in a memory means so as to correspond to the input machining code. A series of machining steps to be performed by each saddle is set by a machining assigning/setting means assigning either a machining code indicating the machining condition at each of the series of the machining steps or a wait command designating one saddle to wait for the end of one machining step by the other saddle. The machining program for each saddle is automatically created by a program creating means. The creation is performed in accordance with the machining codes and the wait commands assigned by the machining assigning/setting means, for corresponding saddles at each machining step and the shape definition and machining data stored in the memory means that corresponds to the machining code.

Thus, according to the present invention, shape definition and machining data for each machining step are input, machining steps are assigned to corresponding saddles, and wait commands designating a saddle to wait for machining in the other saddle to finish are entered, so that a program for each saddle can be automatically created. As a result, the shape definition for each machining step can be input independently of the assignment of the machining steps to the saddles, and programming for each saddle can be performed easily at high speed.

BRIEF DESCRIPTION OF DRAWINGS

FIG. 3 is a diagram for explaining the assignment of machining codes and wait commands to saddles.

DESCRIPTION OF THE PREFERRED EMBODIMENT

Figure 2:
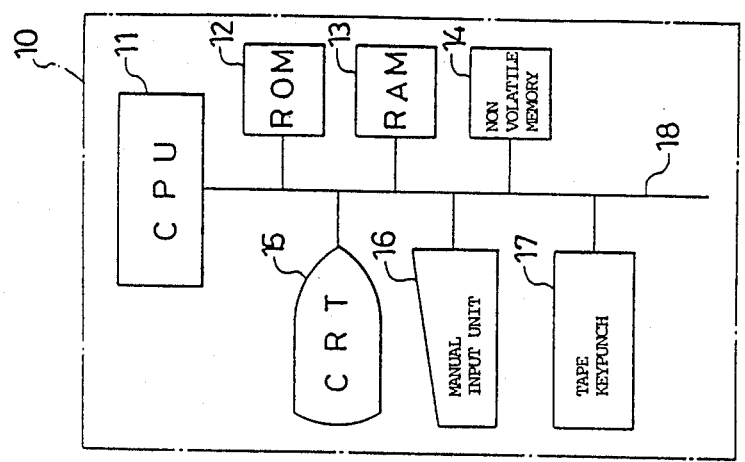
FIG. 2 is a block diagram of an automatic programming apparatus used in an embodiment of the present invention.

FIG. 2 is a block diagram of an example of an automatic programming apparatus 10 for carrying out the automatic programming system of the present invention. Referring to FIG. 2, reference numeral 11 denotes a central processing unit (to be referred to as a CPU hereinafter); 12, a ROM storing a control program for controlling the entire automatic programming apparatus; 13, a RAM for temporarily storing data; 14, a nonvolatile memory for storing an NC program for machining; 15, a display unit; 16, a manual input unit; 17, a tape keypunch; and 18, a bus.

Figure 1:
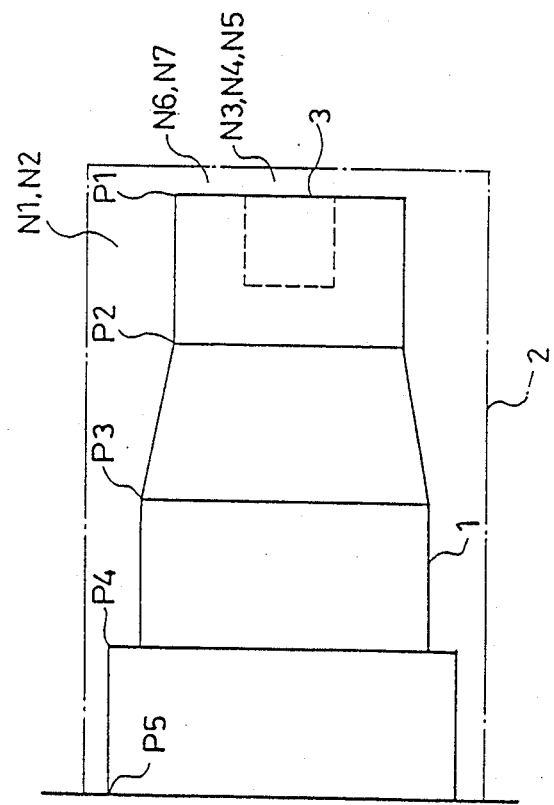
FIG. 1 is a partial plan view of an example of machining by an NC lathe.

The embodiment of the present invention will be described taking as an example programming for manufacturing a product having an outer shape 1 as shown in FIG. 1.

Figure 4:
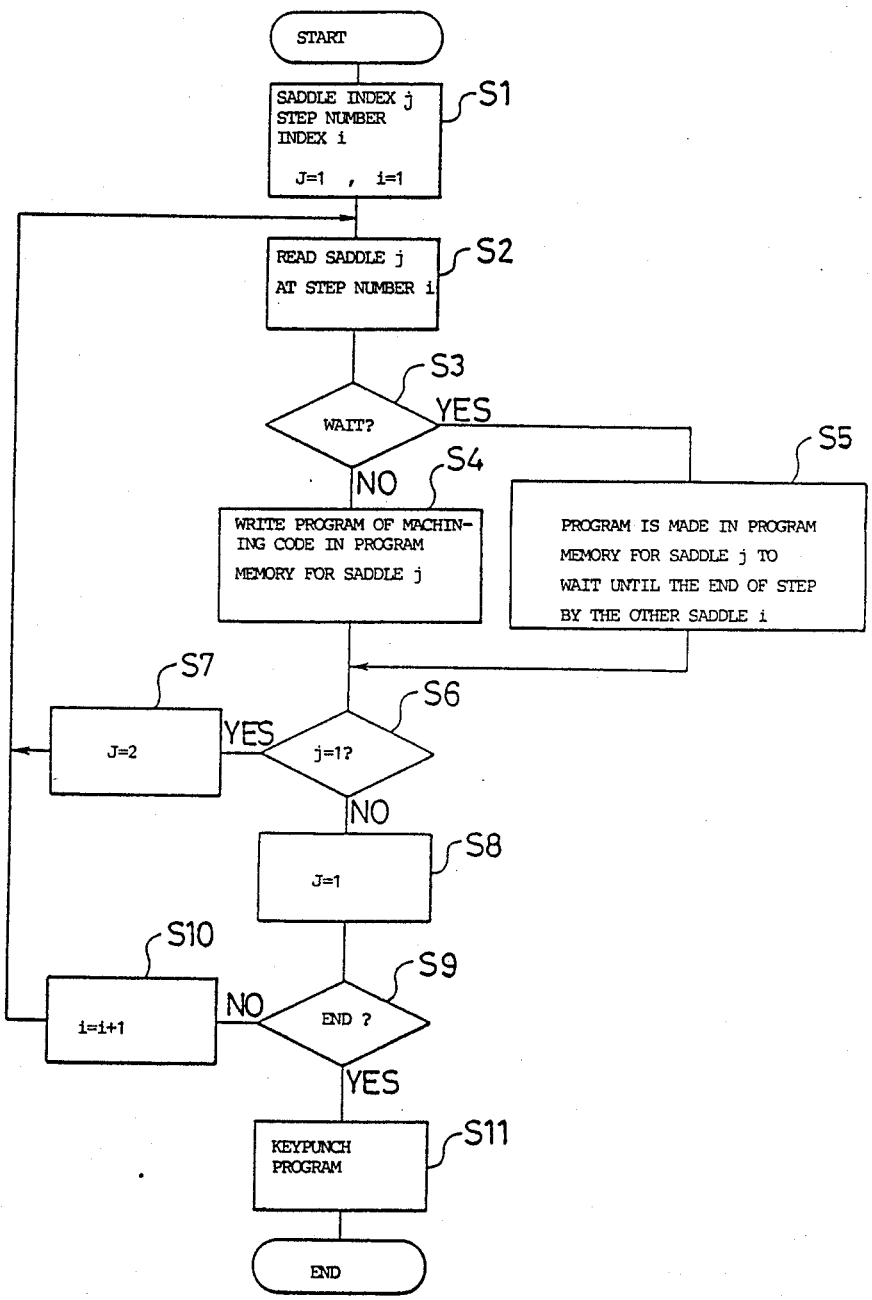
FIG. 4 is a flow chart showing the operation of the embodiment of the present invention.

The operator inputs a program creation command at each machining step from the blueprint shown in FIG. 3 without considering at which saddle machining is to be performed. More particularly, the coordinates of points P1 to P5 in FIG. 1 are input for shape definition from the manual input unit 16 as machining conditions at the rough cutting step N1 of outer-diameter machining. Machining data, such as tool designation and machining speed, is input at the manual input unit 16 simultaneously with a machining code N'1 representing the rough cutting step N1 of the outer-diameter machining. Shape definition (shape definition in the finishing step is the same as that in the rough cutting step, and the shape definition for the latter step is thus also used for the former) and machining data such as tools to be used and machining speeds for each of machining steps N2 to N7 are input simultaneously with corresponding machining codes N'2 to N'7 to be stored in an area of the nonvolatile memory 14. When shape definition and machining data for all the machining steps are input, the operator assigns the machining steps to corresponding saddles, utilizing the display unit 15. More particularly, an assignment table is displayed on the display unit 15 as shown in FIG. 3, and the steps are assigned considering the tool attached to each saddle and the machining state (rough cutting, finishing and so on). With the example in FIG. 1, assuming that the rough cutting step N1 of the outer-diameter machining is performed at the saddle 1, its code N'1 is input to the side of the saddle 1 at step number 1, as shown in FIG. 3. During the rough cutting step N1 of the outer-diameter machining, drilling step N3 and rough cutting step N4 can be performed simultaneously. Therefore, machining codes N'3 and N'4 are input to the side of the saddle 2 at step numbers 1 and 2 so that they are performed at the saddle 2. Meanwhile, a wait command (YES) is input to the side of the saddle 1 at step number 2 so that, after completion of the rough cutting step N1, machining at the saddle 1 is postponed until the rough cutting step N4 finishes at the saddle 2. At step number 3, machining code N'2 and a wait command (YES) are input to the sides of the saddles 1 and 2, respectively, so that the finishing step N2 of the outer-diameter machining is performed at the side of the saddle 1 while the saddle 2 waits. In the same manner, machining codes N'5 to N'7 and a wait command (YES) are assigned to the saddles 1 and 2 as shown in FIG. 3, so that, at step number 4, the finishing step N5 for the hole is performed at the side of the saddle 2 while the saddle 1 waits, and rough cutting N6 and finishing N7 of the face grinding are performed after the finishing step N5 is completed. Assignment is thus completed. When a program creation command is input, the automatic programming unit 10 creates machining NC programs for the saddles 1 and 2 and outputs them from the tape keypunch 17. Processing by the automatic programming unit 10 in this case will be described with reference to the flow chart of FIG. 4.

When the program creation command is input, the CPU 11 sets to 1 a saddle index j and a step number index i in step S1, and reads in step S2 a machining code or a wait command (machining code N'1 in this embodiment) input to the saddle 1 at step number 1. In step S3, it is determined whether a wait code has been input. In this embodiment, no wait command is input (NO), but machining code N'1 is input. Therefore, in step S4, shape definition and machining data (tool designation and machining speed) stored in an address area of the nonvolatile memory 14 corresponding to the machining code N'1 are read out, and the CPU 11 creates a program and writes it in a predetermined area of the nonvolatile memory 14 as a program for the saddle 1. Note that the sequence for creating a machining program from shape definition and machining data is the same as that employed by conventional automatic programming units and is therefore omitted. In step S6, CPU 11 determines whether the saddle index j is 1. Since j=1 (YES) at this time, the saddle index j is set to 2 in step S7 to perform processing from step S2. More specifically, machining code N'3 is read out from the column of the saddle 2 (j=2) and step number 1 (i=1) in step S2. In steps S3 and S4, a machining program corresponding to the machining code N'3 is written as a machining program for the saddle 2 at an address area for the saddle 2 in the nonvolatile memory 14. Then, in steps S6 and S8, the saddle index j is changed from 2 to 1. It is determined in step S9 whether the machining program has ended. If NO, step number index i is incremented to 2 and processing is performed from step S2. When the column of the saddle 1 (j=1) is read in step S2 and a wait command is read (YES) therefrom at step number 2 (i=2) in step S2, the flow advances to step S3. If YES in step S3, the program for the saddle 1 is written in step S5 such that the saddle 1 waits until the end of machining by the saddle 2. Then, the saddle index j is set to 2 in steps S6 and S7. Machining code N'4 is read from the side of the saddle 2 at step number 2, and a machining program is formed from shape definition and machining data corresponding to the machining code N'4 and added to the program for the saddle 2 (steps S2, S3 and S5). In this manner, the step number is incremented, a machining code or wait command at the side of the saddle 1 or 2 is read at each step number, and programs for the saddles 1 and 2 are written in accordance with the thus read machining code or wait command and are added to the corresponding memory areas of the memory 14. When the entire program is completed (step S9), a machining program for each saddle is punched by the tape keypunch 17 (step S11), and automatic programming is completed.

With the machining program formed in the manner described above, one saddle may not perform finishing while the other performs rough cutting. When possible, however, machining steps are performed simultaneously. When machining cannot be performed simultaneously, machining at one saddle waits until the end of machining at the other.

In the embodiment described above, programs are created and stored for each saddle in the order of step number. The programs can also be formed by reading out in the order of step number all machining codes or wait commands for one saddle, and then doing the same for the other saddle. In this case, the program need not be stored in the nonvolatile memory 14 but can be punched directly by the tape keypunch 17. The flow chart for this is as follows: steps S6 and S7 come after step S9 so that the saddle index j is set to 2 after the end of program creation for the saddle 1 (j=1); the step number index i is incremented thereafter; and the program for the saddle 2 is created and punched out.

We claim:

1. An automatic programming system for a two-saddle NC turret lathe, comprising:
    machining step manual input means, connected so as to be manually operable by an operator, for receiving manually input shape definition data defining a machining condition for each of a plurality of machining steps, for receiving machining data including at least a tool designation and a machining speed and for receiving a manually input machining code identifying each machining step;
    memory means for storing the received shape definition data and the received machining data in accordance with the received machining code;
    machining assigning/setting means for manually assigning a series of the machining steps to be performed by each saddle by manually inputting either a machining code indicating the machining condition at each machining step or a wait command designating one saddle to wait for completion of machining by the other saddle; and
    program creating means for automatically creating a machining program for each saddle in accordance with the machining codes and the wait commands manually input by said machining assigning/setting means to corresponding saddles at each machining step, and the shape definition and machining data stored in said memory means.

* * * * *